March 17, 1970     V. L. PLAGGE     3,501,662
PLANAR OR THREE-DIMENSIONAL FLUORESCENT LAMP
AND METHOD OF MANUFACTURE
Filed Dec. 29, 1967

INVENTOR
Vernon L. Plagge
BY
D. S. Bulera
AGENT

United States Patent Office 3,501,662
Patented Mar. 17, 1970

3,501,662
PLANAR OR THREE-DIMENSIONAL FLUORESCENT LAMP AND METHOD OF MANUFACTURE
Vernon L. Plagge, East Orange, N.J., assignor to Westinghouse Electric Corporation, Pittsburgh, Pa., a corporation of Pennsylvania
Filed Dec. 29, 1967, Ser. No. 694,553
Int. Cl. H01j 9/26, 61/35
U.S. Cl. 313—109
10 Claims

ABSTRACT OF THE DISCLOSURE

Two or more sections of glass tubing of the type used for conventional fluorescent lamp envelopes are joined together in side-by-side relationship and the tube ends are sealed off to form a planar or three-dimensional envelope. Aligned apertures in the adjacent side wall portions of the tubes form passageways which connect the tubes and provide a single sinuous discharge channel. In the case of a bisectional planar lamp, one end of each of the tubes is sealed off by forming a domed end wall, the apertures are made in the side walls, and the tubes are then coated with phosphor and joined together in planar configuration by fused solder glass which surrounds the aligned apertures and seals off the formed passageways from the atmosphere. Electrode-stem assemblies are then sealed into the open ends of the tubes, the envelope is evacuated and charged with mercury and a suitable fill gas through a tubulation on one of the stems, and the tubulation is tipped off. Three or more tube sections are coupled together in non-planar array to form a three-dimensional envelope and lamp.

Background of the invention

This invention relates to electric discharge lamps and has particular reference to a fluorescent lamp of planar or three-dimensional configuration and to a method for manufacturing such a lamp.

So-called "planar" fluorescent lamps are well known in the art and consist of an envelope which defines a discharge channel which is of sinuous or spiral configuration. Thus, the light is concentrated within a given area and provides a planar light source as contrasted to the linear source of light produced by a conventional tubular fluorescent lamp.

Such planar fluorescent lamps have heretofore been manufactured by separately molding two glass members that are so shaped that they provide the desired sinuous discharge channel when the members are sealed together in abutting relation. Planar fluorescent lamps utilizing such molded glassware components are disclosed in U.S. Patents Nos. 2,465,123, 2,987,640 and 3,047,763. Another approach has been to heat flat pieces of glass and allow them to sag into suitably contoured molds to form the separate halves of the envelope.

As will be obvious, envelopes made from either pressed or sagged glassware are costly and difficult to make because of the complicated shapes that are required. In addition, the finished envelope by virtue of its labyrinthine interior and sinuous discharge channel is difficult to coat with phosphor without producing unsightly drain patterns, etc.

Objectives and summary of the invention

It is accordingly the general object of the present invention to provide a non-linear fluorescent lamp or similar electric discharge device that not only avoids the cost and manufacturing problems associated with the envelopes formed from molded or pressed glassware but can be readily fabricated from conventional lamp components.

Another object is the provision of a method for manufacturing a planar or three-dimensional discharge lamp utilizing such components.

The aforesaid objects and other advantages are achieved in accordance with the present invention by making the envelope from sections of conventional fluorescent lamp tubing that are joined together in side-by-side relationship to form an integral planar envelope. Alternatively, the tube sections are arranged in a geometrical array such that they form a three-dimensional envelope. The ends of the tubes are hermetically sealed off and the tubes are interconnected by aligned apertures in the side walls. The tubes are coated with phosphor prior to being assembled and joined together, and the envelope is provided with electrode stems, evacuated, etc. in accordance with standard lamp-making practices.

Brief description of the drawing

A better understanding of the invention will be obtained by referring to the accompanying drawing, wherein.

Description of the preferred embodiment

Figure 1:
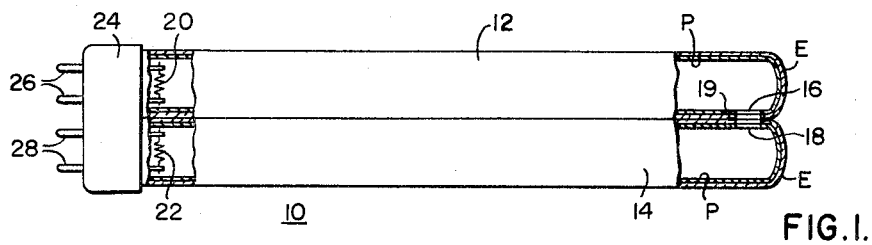
FIGURE 1 is an elevational view of a planar fluorescent lamp which embodies the present invention and has a U-shaped discharge channel, portions of the envelope being broken away to show features of the lamp interior.

In FIG. 1 there is shown a planar fluorescent lamp 10 having an envelope that is formed from two sections 12 and 14 of conventional fluorescent lamp tubing that are interiorly coated with a layer P of a suitable ultraviolet-responsive phosphor and are joined together in side-by-side abutting relationship. The glass bulbs or tubes 12 and 14 are cylindrical and their adjacent ends are closed by rounded end walls E which are formed by heat-softening the glass and shaping it into a smooth dome. The abutting side wall portions of the tubes 12 and 14 adjacent the domed walls E are provided with apertures 16 and 18, respectively, which are aligned with one another as shown and form a passageway that connects the tube interiors. This passageway is hermetically sealed off from the atmosphere by suitable means such as a layer 19 of low melting point solder glass which surrounds the apertures 16 and 18 and fuses the tubes 12 and 14 together in this region.

The opposite ends of the glass tubes 12 and 14 are sealed off by conventional stem assemblies (not shown) which support a pair of cathodes 20 and 22 at the ends of the respective tubes. The discharge channel in this particular lamp is thus U-shaped and extends from the cathode 20, through tube 12 and interconnecting passageway formed by the aligned apertures 16 and 18, and thence through tube 14 in the opposite direction of the other cathode 22.

The ends of the glass tubes 12 and 14 that are sealed to the electrode-stem assemblies are fitted with an enclosing base member 24 that has two pairs of insulated contacts such as metal pins 26 and 28 which are electrically connected to the cathodes 20 and 22 and thus serve as the lamp terminals. One of the electrode-stem assemblies is provided with a glass exhaust tube (not shown) and the envelope is evacuated, dosed with mercury and filled with a suitable starting gas (such as argon or neon) through the exhaust tube in the usual fashion before the latter is tipped off. Since the glass tubes 12 and 14 are joined together in abutting relationship by the fused body of solder glass 19 and locked together at their opposite ends by the spanning base member 24, the lamp 10 is very rugged.

The foregoing construction permits a single-ended fluorescent lamp to be readily manufactured in which all of the lead-in conductors are disposed in close proximity at the basal end of the lamp and the light-emitting tubes are essentially side-by-side—in contrast to conventional U-bent lamps in which the ends of the tubes are spaced a considerable distance apart due to the practical limitations of making a smooth U-bend in a single section of glass tubing.

Another advantage derived from the invention is the improvement in light output compared to circline and conventional U-bent fluorescent lamps. Since these lamps are bent into the desired shape after the bulb has been coated with phosphor, the phosphor coating frequently breaks away and falls off the bulb leaving unsightly and intolerable clear spots in the region of the bend. To provide adequate adherence and correct this problem in the case of circline lamps, the phosphor is milled extra fine, the coating density is kept lower than optimum and foreign bonding agents are used—all of which reduce the lumen output of the lamp. Since the panel lamp of the present invention eliminates the need for bent envelopes, the phosphor particle size, the coating density, etc. do not have to be compromised and can be freely adjusted to obtain maximum lumen output.

Method of manufacture

Figure 2:
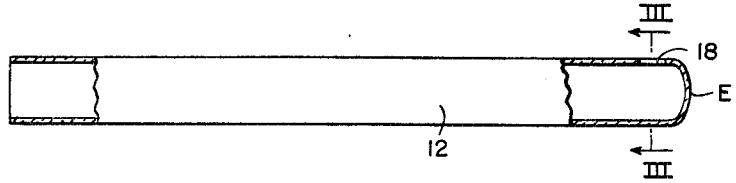
FIG. 2 is an elevational view of one of the glass tube components used in manufacturing the envelope of the lamp shown in FIG. 1.
Figure 3:
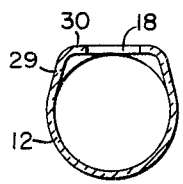
FIG. 3 is an enlarged cross-sectional view through the apertured portion of the glass tube component taken along the line III—III of FIG. 2.
Figure 4:
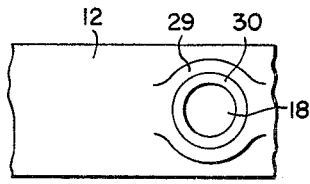
FIG. 4 is a fragmentary plan view of the aforementioned apertured portion of the glass tube.

The bi-sectional envelope utilized in the lamp 10 shown in FIG. 1 can be readily fabricated from sections of glass tubing of the type used as the envelopes of conventional tubular fluorescent lamps. As shown in FIG. 2, a tube section 12 of the proper length is first cut from such tubing and one end is closed by forming a dome-shaped end wall E. The portion of the tube immediately adjacent the end wall E is then heated to plasticity, placed into a suitable mold and blown against the mold to distend the tube from its original circular cross-section and form an angular shoulder 29 and a flat annular boss 30 of the character and configuration shown in FIGS. 3 and 4. The center of the flat boss 30 is then heated and an aperture 18 is blown through the tube wall. The aperture 18 is of sufficient size to permit passage of the gaseous discharge in the finished lamp without unduly constricting the arc.

Figure 5:
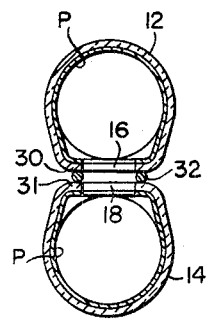
FIG. 5 is a cross-sectional view of two glass tubes that have been phosphor-coated and assembled for the sealing operation in accordance with the present invention.

The other tube segment 14 is processed in the same manner as above described and the tubes are then flush coated with a fluid mixture or phosphor "paint" consisting of a suitable volatile vehicle, an organic binder and suspended phosphor particles. The coated tubes are then placed in a suitable jig or fixture so that the apertures 16 and 18 are aligned with one another, as shown in FIG. 5, and a ring of low melting point solder glass such as Corning No. 7570 is interposed between the annular bosses 30 and 31. The solder glass can be in the form of a glass ring, as here shown, or may constitute a glass powder that is mixed with a suitable organic binder to form a paste which is coated onto the annular bosses.

The foregoing assembly is then placed into a furnace and heated to a temperature of approximately 560° C. to bake out the binder from the coating and melt the solder glass, thus hermetically sealing the bosses 30 and 31 together and leaving the desired thin layer of phosphor P on the inner surfaces of the tubes. The resulting integral planar envelope is then cooled to room temperature at a rate which will prevent the development of detrimental strains in the glass.

Conventional electrode-stem assemblies are then sealed into the open ends of the tubes 12 and 14 in the usual manner and the lamp is subjected to the customary exhaust, cathode-treating, mercury dosing and gas charging operations. The tubulated stem is then tipped-off, the base 24 is fastened to the sealed ends of the tube segments with a suitable cement, and the pins 26 and 28 are electrically connected to the cathodes 20 and 22 in accordance with standard lamp-making techniques to form a finished lamp of the type shown in FIG. 1.

As will be obvious to those skilled in the art, the electrode-stem assemblies can be sealed into the open ends of the tubes 12 and 14 before the latter are joined together, if desired.

Alternative embodiments

Figure 6:
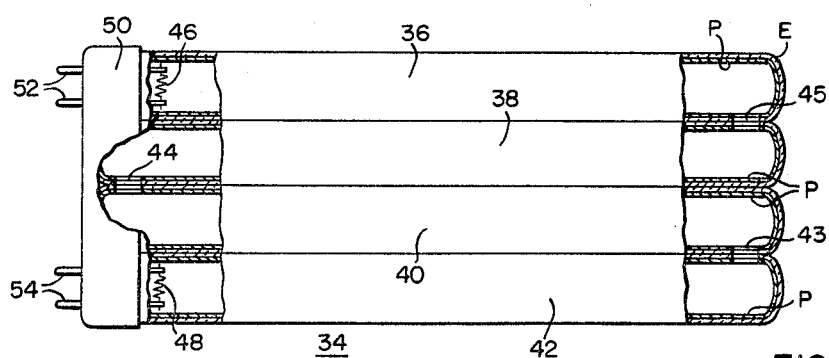
FIG. 6 is an elevational view, partly in section, of an alternative lamp embodiment having an envelope formed of four sections of glass tubing that are interconnected to form a longer sinuous discharge channel and a planar light source of much larger size.

In FIG. 6 there is shown an alternative lamp embodiment 34 having twice the number of tube segments and thus twice the surface area as the lamp 10 previously described. According to this embodiment, four glass tubes 36, 38, 40 and 42 of equal length are joined together in side-by-side array by layers of fused solder glass (not shown) to form an integral planar envelope of rectangular configuration. One end of the outermost tubes 36 and 42 and both ends of the centrally-located tubes 38 and 40 are closed by domed end walls E and the inner surfaces of the tubes are coated with a phosphor layer P in the manner described above in connection with the FIG. 1 embodiment. The opposite ends of the outwardly-disposed tubes 36 and 42 are provided with stems, one of which is tubulated as before. The adjacent side wall portions of the respective tubes are provided with aligned apertures which form a series of passageways 43, 44 and 45 that are located at alternate ends of the envelope so that the discharge proceeds from cathode 46 in sinuous fashion through the respective tubes and thence to the other cathode 48.

The base 50 is of sufficient width to encompass the ends of the respective tubes and, as before, carries sets of pins 52 and 54 that are connected to the cathodes 46 and 48.

As will be apparent from the foregoing, the objects of the invention have been achieved in that a planar fluorescent lamp has been provided which can be readily formed from sections of standard glass tubing and conventional lamp parts. The desired area-type light source is thus attained without the use of expensive complicated molded or sagged glassware and the lamp-manufacturing problems which such glassware entails.

While several lamp embodiments and a method of manufacture have been described, it will be appreciated that various modifications can be made without departing from the spirit and scope of the invention. For example, the tube sections can be joined together by tubular nipples of a suitable metal such as a chromium-iron-nickel alloy that will form a hermetic seal with the lime glass tubing and provide the desired interconnecting passageways. The nipples can be tapered at each end to facilitate the alignment of the apertures in the tubes during assembly and can be heated by means of an RF coil to a uniform temperature and thereby uniformly transmit its heat to the glass during the sealing-in operation. This is difficult to do in any conventional manner using gas burners.

The above-described solder glass seal-junctures can also be eliminated by using cut sections of infrared-absorbing glass as the sealing medium and fusing them in place around the tube apertures by focusing the radiation from several quartz-iodine lamps on the seal area.

Also, a panel of suitable light-diffusing plastic can be fastened or molded in situ to one face of the lamp to provide a more pleasing and uniform light source. If such a panel were fastened to each of the tube sections and extended around one end of the envelope, the lamp terminals could also be anchored in the panel. The latter would thus also serve as the base structure and a separate base component would not be required.

Figure 7:
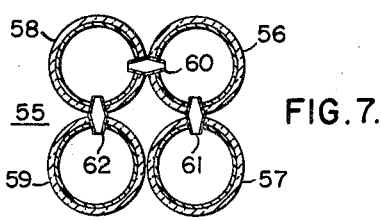
FIG. 7 is a cross-sectional view of another lamp embodiment in which four tube sections are joined together to form a three-dimensional rectangular envelope.

More than four tube sections can be joined together and they can be of various lengths and arranged to form a lamp which is planar but non-rectangular. The tube sections can also be coupled together in three-dimensional array to form a lamp that is non-planar. For example, four tube sections can be joined together so that the envelope is of rectangular cross-section and provides a rectangular block of light when the lamp is energized. A lamp 55 of this type is shown in FIG. 7. As illustrated, four phosphor-coated glass tubes 56, 57, 58 and 59 are joined together by three metal nipples 60, 61 and 62 to form an integral three-dimensional rectangular envelope. The nipples are tapered at both ends and sealed into suitably located apertures in the sides of the respective tube sections to provide the necessary interconnecting passageways and a single continuous discharge channel that traverses each of the tubes in sinuous fashion.

I claim as my invention:

1. A low-pressure electric discharge lamp comprising:
   a plurality of elongated vitreous tubular members that are joined together in side-by-side relationship and are closed at each end,
   adjacent side wall portions of said joined tubular members having aligned apertures therein that are sealed off from the atmosphere and define passageways which interconnect the respective tubular members so that said tubular members thereby constitute an integral hermetically sealed envelope that is of non-linear configuration and defines a single discharge channel that sinuously traverses said tubular members,
   a pair of electrodes located within and at the ends of the tubular members that define the ends of said single discharge channel, and
   an ionizable medium in said envelope adapted to sustain an electric discharge between said pair of electrodes when the lamp is energized.

2. The discharge lamp set forth in claim 1 wherein said tubular members are of substantially the same length and are so arranged that the envelope is of three-dimensional configuration.

3. The discharge lamp set forth in claim 1 wherein;
   said envelope is of planar configuration and comprises an even number of joined vitreous tubular members that are of substantially equal length and aligned with one another,
   said pair of electrodes are sealed into the ends of the respective outermost tubular members that are located at the same peripheral edge of said envelope, and
   a base member is attached to and spans the ends of the tubular members that constitute the aforesaid peripheral edge of the envelope.

4. The planar discharge lamp set forth in claim 3 wherein;
   said envelope contains a predetermined amount of mercury and an ionizable fill gas, and
   the inner surfaces of said tubular members are coated with a layer of ultraviolet-responsive phosphor and said lamp thus constitutes a planar fluorescent lamp.

5. The planar fluorescent lamp set forth in claim 4 wherein;
   said tubular members are of cylindrical configuration and held in abutting relationship by fused solder glass that is interposed between the adjacent tubular members, and
   said base member includes contacts that are electrically connected to the electrodes and serve as lamp terminals.

6. The planar fluorescent lamp set forth in claim 4 wherein;
   said envelope consists of two cylindrical glass tubes that are joined together in abutting relationship, and
   the apertures which form the interconnecting passageway are located in abutting side wall portions of said tubes that are remote from said electrodes and said discharge channel is thus U-shaped.

7. The planar fluorescent lamp set forth in claim 4 wherein:
   said envelope consists of four cylindrical glass tubes that are joined together in abutting relationship, and
   the apertures which form said interconnecting passageways are located in abutting side walls of the respective tubes and are arranged so that the passageway connecting the centrally-disposed pair of tubes is located adjacent the basal end of the lamp and the passageways connecting the respective ones of said centrally-disposed pair of tubes with the adjacent outwardly-disposed tubes are located at the opposite end of the lamp.

8. The method of manufacturing a non-linear fluorescent lamp comprising;
   forming a pair of hollow glass tubes,
   hermetically closing one end of each of said tubes,
   forming an aperture in the side wall of each of said tubes adjacent the closed end thereof,
   coating the inner surfaces of said tubes with phosphor,
   placing said phosphor-coated tubes in side-by-side relationship so that the said apertures are aligned with each other,
   hermetically joining the apertured side wall portions of said tubes to form an integral envelope having two elongated chambers that are connected by a passageway that is sealed off from the atmosphere,
   sealing an electrode-stem assembly to the open end of one of said tubes and thereby closing said one tube,
   sealing another electrode-stem assembly having a depending exhaust tubulation to the open end of the other of said tubes,
   evacuating said envelope and introducing predetermined amounts of mercury and a fill gas into the evacuated envelope through said exhaust tubulation, and then
   tipping off said tubulation.

9. The method set forth in claim 8 wherein;
   said glass tubes are of substantially equal length and circular cross-section,
   the apertured side wall portions of the respective tubes are distended outwardly by the application of heat and pressure to provide flat annular bosses that encircle the respective apertures,
   said tubes are interiorly coated with a fluid mixture of an organic binder, a volatile vehicle, and suspended phosphor particles,
   a quantity of solder glass is placed on the flat annular boss of at least one of the glass tubes after said tubes have been coated with said fluid mixture,
   said tubes when assembled in side-by-side relationship are oriented so that the annular bosses are disposed in overlapping relationship with the solder glass therebetween, and
   the juncture of said tubes and the removal of the organic binder from the phosphor coating are concurrently effected by heating the assembled tubes to a temperature above the melting point of the solder glass and then cooling the tubes to room temperature.

10. The method of manufacturing a non-linear electric discharge lamp comprising;
forming at least three hollow glass tubes,
hermetically closing one end of a pair of said tubes and hermetically closing both ends of the remainder of said tubes,
forming an aperture in the side wall of each of said pair of tubes adjacent the closed end thereof,
forming a pair of apertures in the side walls of each of the remainder of said tubes adjacent the respective closed ends thereof and at locations such that the apertures of each pair are circumferentially offset with respect to each other,
placing said tubes in side-by-side relationship and a geometrical array such that said pair of tubes comprise the first and last tubes in the array and the apertures in the tubes are aligned with those of the adjacent tubes,
hermetically joining the apertured side wall portions of said tubes to form an integral envelope having elongated chambers that are connected by passageways which are sealed off from the atmosphere,
sealing an electrode-stem assembly into the open end of one of said pair of tubes,
sealing another electrode-stem assembly having a depending exhaust tubulation onto the open end of the other of said pair of tubes,
evacuating said envelope and introducing an ionizable medium into the evacuated envelope through said exhaust tubulation, and then
tipping off said tubulation.

References Cited

UNITED STATES PATENTS

| 1,867,340 | 7/1932 | Weinhart et al. | 240—51.12 |
| 1,984,502 | 12/1934 | Uyterhoeven et al. | 313—220 X |
| 2,123,709 | 7/1938 | Bristow et al. | 313—220 |
| 2,561,868 | 7/1951 | Jenkins et al. | 313—1 X |
| 2,743,388 | 4/1956 | Bartley | 313—220 X |

RAYMOND H. HOSSFELD, Primary Examiner

U.S. Cl. X.R.

220—2.1; 313—220; 316—19